United States Patent
Huboi et al.

(10) Patent No.: US 7,313,592 B1
(45) Date of Patent: *Dec. 25, 2007

(54) METHOD AND APPARATUS FOR PROVIDING USER SPECIFIC WEB-BASED HELP IN A DISTRIBUTED SYSTEM ENVIRONMENT

(75) Inventors: Peter A. Huboi, Aptos, CA (US); Shailendra Sharma, Sunnyvale, CA (US); Laurence C. Chan, Fremont, CA (US); John Epplett, Mt. Shasta, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 474 days.

This patent is subject to a terminal disclaimer.

(21) Appl. No.: 10/932,373

(22) Filed: Aug. 9, 2004

Related U.S. Application Data

(63) Continuation of application No. 09/753,341, filed on Dec. 29, 2000, now Pat. No. 6,799,198.

(60) Provisional application No. 60/213,661, filed on Jun. 23, 2000.

(51) Int. Cl.
*G06F 15/16* (2006.01)
(52) U.S. Cl. ...................... 709/203; 709/223
(58) Field of Classification Search ............... 709/238; 707/104; 705/10
See application file for complete search history.

(56) References Cited

U.S. PATENT DOCUMENTS

| | | | |
|---|---|---|---|
| 5,999,908 A | 12/1999 | Abelow | |
| 6,014,634 A | 1/2000 | Scroggie et al. | |
| 6,212,560 B1 | 4/2001 | Fairchild | |
| 6,343,320 B1 | 1/2002 | Fairchild et al. | |
| 6,349,295 B1 | 2/2002 | Tedesco et al. | |
| 6,490,617 B1 | 12/2002 | Hemphill et al. | |
| 6,493,717 B1 | 12/2002 | Junkin | |
| 6,526,442 B1 | 2/2003 | Stupek et al. | |

(Continued)

OTHER PUBLICATIONS

Enabling large-scale simulations: selective abstraction approach to the study of multicast protocols Huang, P.; Estrin, D.; Heidemann, J.; Modeling, Analysis and Simulation of Computer and Telecommunication Systems, 1998. Proceedings. Sixth International Symposium on Jul. 19-24, 1998 pp. 241-248.*

(Continued)

*Primary Examiner*—Thong Vu
(74) *Attorney, Agent, or Firm*—McGuinness & Manaras LLP

(57) ABSTRACT

The present invention provides a system in which a user can login to a World Wide Web server's (Web) application page and get help on the features assigned to an instrument such as a telephone or a service such as a voicemail system that is a configurable asset specifically assigned to that user. The on-line help is preferably kept in text and/or multimedia format on a server. The entity or that is displaying the help information is preferably a different entity than the service provider device that is providing the functionality or service to the asset. A synchronization process occurs so that thew server providing the Web-based help has a database of features assigned to the user as well as other information about the user.

6 Claims, 13 Drawing Sheets

U.S. PATENT DOCUMENTS

| | | |
|---|---|---|
| 6,578,066 B1 | 6/2003 | Logan et al. |
| 6,687,734 B1 | 2/2004 | Sellink et al. |
| 7,003,560 B1 * | 2/2006 | Mullen et al. .............. 709/223 |
| 2002/0073101 A1 * | 6/2002 | Stoyen .................... 707/104.1 |
| 2004/0193480 A1 * | 9/2004 | Pinsonnault et al. .......... 705/10 |

OTHER PUBLICATIONS

A general framework for building networked expert systems Hongmin Zhang; Dongping Zhu; MILCOM 97 Proceedings vol. 3, Nov. 2-5, 1997 pp. 1589-1593 vol. 3.*

Thurman, Tracy, Mitchell, "Design of an Intelligent Web-Based Help Desk System," www.isye.gatech.edu/chmsr/publications/smc97/dat/HelpDesk.smc97.pdf, 1997.

ITS-96 paper, www.contrib.andrew.cmu.edu/~plb/ITS96.html, 1996.

van Moorsel, Huang, "Reusable Software Components for Performabilty Tools, and..," wwwl.bell-labs.com/user/aad/Publications/98tools.ps, (1998).

Scott, David Wishart, "A Platform-Independent Graphical User Interface for SEQSEE.." www.cs.ualberta.ca/~duane/publications/ByYear/../papers-ps/CABIOS97.ps, 1997.

* cited by examiner

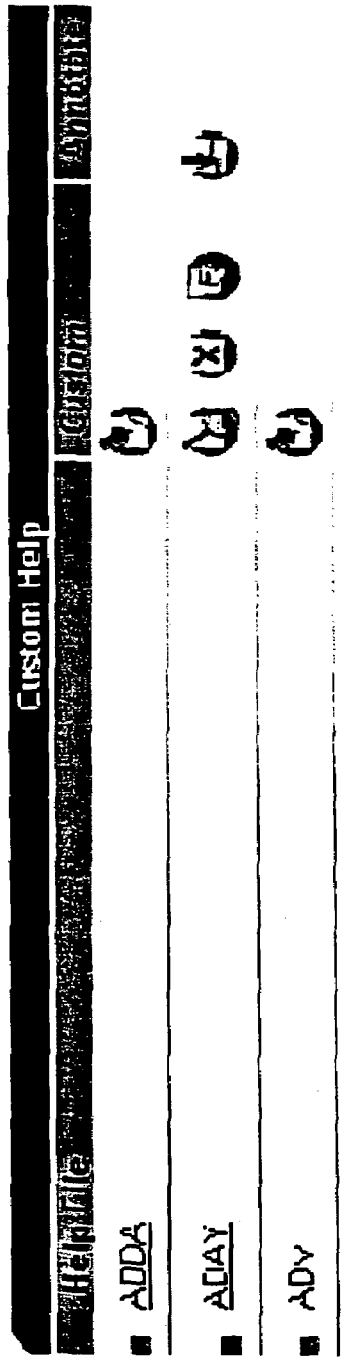
FIG. 6

1100

| Features | | Value |
|---|---|---|
| AEFD | Alternate External Flexible Call Forward | |
| AEHT | Alternate External Hunt DN | |
| AFD | Alternate Flexible Call Forward DN | |
| AHA | Automatic Hold | Denied |
| AHNT | Alternate Hunt DN | |
| ARTO | Alternate Redirection Time Option | 0 |
| CFHA | Call Forward/Hunt Override | Denied |
| CFTA | Call Forward by Call Type | Denied |
| DRG1 | Distinctive Ringing Tone | High Fast Tone |
| EFD | CFNA DN for External Calls with CFTA | |
| EHT | Hunt DN for External Calls with CTA | |
| FBA | Call Forward Busy for DID Calls | Denied |

FIG. 11

Telephone

Ext. 1203

| General | Keys | Features | Details |

Telephone Details

Keys and Features for:
DN: 1204, Station Location: mpk4
System: Sample Site - Sample System, Phone Type: M3904
Terminal Number: 0120 10 01, Designation: MPK4

| Key ID | Description | Attribute | Value |
|---|---|---|---|
| 0 | 1204 | Directory Number | 1204 |
| | | First Name | Digby |
| | | Last Name | Epplett |
| 16 | Message | Message Center DN | 3010 |

METHOD AND APPARATUS FOR PROVIDING USER SPECIFIC WEB-BASED HELP IN A DISTRIBUTED SYSTEM ENVIRONMENT

CROSS-REFERENCE TO RELATED APPLICATIONS

This application is a continuation of U.S. application Ser. No. 09/753,341 filed Dec. 29, 2000, now U.S. Pat. No. 6,799,198 which is based on and claims priority to U.S. Provisional Application No. 60/213,661, filed Jun. 23, 2000.

TECHNICAL FIELD

The present invention relates to configurable assets in a distributed system environment, and more particularly, to providing feature help for specific users of configurable assets in a distributed system environment.

BACKGROUND

A wide variety of service provider devices provide services to users through the use of configurable assets. Typically, the service provider device is configurable as well. A common example of a service provider device is a telecommunications switch, such as a private branch exchange (PBX) device, that services the configurable assets, such as telephones, that are connected to the device. The distinction between a service provider device and an asset as used herein is that the device is an entity that provides a service and that is owned by the organization or administrators managing and providing the service, while the asset is the entity that receives the service provided by the device and that is owned by, or configured for the use of, an end user.

The assets are primarily controlled by the configuration of the device, for example, the switch. However, a limited amount of control often resides with the end user of the asset so that the end user can manage and program the features offered by the asset and the device.

The users of these assets can program them directly or through the use of software applications to alter the default functionality of the asset. For example, a user can often program the keys and features of the user's telephone to behave differently from other telephones.

Similarly, administrators can program a telecom switch to support one set of features versus another set of features, or to alter the accessibility and behavior of the set of features available to the assets controlled by the switch.

Often, help information regarding features on assets such as telephones is provided in brochures that the user misplaces or files away. Other methods of providing online help may provide help on all possible features. This may make it more difficult for the user to zero in on or to find help on a feature that is specific to them. Also, when all help is provided, the user may see a feature that is not provisioned for them that they would like to use or that they have questions about. If such were the case, that user might take up more of the administrator's time and the administrator might have to explain to the user a feature that this user is not even allowed to have—as a policy decision, for example.

Typically, on-line help is an electronic version of all feature operations. In a configurable asset environment, only a limited set of all features may be implemented. So in either a printed document or on-line version of all feature help the user is presented with much more information than is needed and has more difficulty navigating to the specific help that is needed.

In other instances, the issue extends beyond a set of features that are made available or that are denied to a user. Feature behavior can change dynamically because of programmatic changes introduced on the service provider devices or on the assets serviced by the devices.

It is thus a challenge to provide help information on features, commands and operational behavior of an asset to its user subject to ever changing conditions of the asset and the device that controls it. The user often has to wade through pages of manuals, which may also be lost by this time, to get help on a feature. Furthermore, such information may only be useful for providing help on static features, that is, features that are either enabled or disabled but whose fundamental behavior does not change. Users would not have any help or guidance on how to use or work with features that change dynamically. An example of a dynamic feature is the numeric prefix that often needs to be dialed to get to an external phone from an internal telephone line in a company.

As network and communication devices become more versatile and programmable, it is desirable to present the user of these resources with an accurate guide to using these features. It would be useful to provide the user with specific help information in accordance with actual assets used by that user, for example, in a distributed system environment. At the same time, it is desirable not to burden the user with complex technical details, which might even be outmoded in the wake of dynamic programming of asset and device functionality. It would be desirable to limit the security risks and to reduce the chance of contention over access to features by focusing help information on those features that are both operational and that are within the purview of the end user.

SUMMARY

Systems and methods of managing configurable assets in a distributed system environment are presented. The present invention provides a system in which a user can login to a World Wide Web server's (Web) application page and get help on the features assigned to an instrument such as a telephone or a service such as a voicemail system that is a configurable asset specifically assigned to that user. The on-line help is preferably kept in text and/or multimedia format on a server. The entity or that is displaying the help information is preferably a different entity than the service provider device that is providing the functionality or service to the asset. A synchronization process occurs so that the server providing the Web-based help has a database of features assigned to the user as well as other information about the user.

A system to manage configurable assets in a distributed system environment is provided according to one aspect of the invention. The system includes a database and a management server. The database stores help information about the configurable assets and user information about users associated with the configurable assets. The management server receives requests for the help information from the users. The management server is operable to send the help information to the users in accordance with the user information.

A system to manage configurable assets in a distributed system environment is provided according to another aspect of the invention. The system includes a service provider, several configurable assets, and a management server. The configurable assets are under control of the service provider device. The management server includes a help database, a security database, a security interface, a network discovery interface, an interface, and an application interface. The help database stores help information about the configurable assets and the service provider device, and about features of the configurable assets and the service provider device. The security database stores user information about users associated with the configurable assets. The security interface updates the user information. The security interface grants users access to the help information according to the user information. The network discovery interface automatically discovers status information regarding the service provider device and the configurable assets. The interface automatically updates the help information according to the status information. The interface manually updates the help information according to instructions from an administrator of the management server. The application interface receives requests for the help information from the users. The application interface is operable to send the help information to the users in accordance with the security interface.

A method of managing configurable assets in a distributed system environment is provided according to another aspect of the invention. Help information about several configurable assets and a service provider device and about features of the configurable assets and a service provider device is stored. The configurable assets are under control of the service provider device. User information about users associated with the configurable assets is stored. The user information is updated. Status information regarding the service provider device and the configurable assets is automatically discovered. The help information is automatically updated according to the status information, and manually updated according to instructions from an administrator. Requests for the help information are received from the users. The users are granted access to the help information according to user information. The help information is sent to the users.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The foregoing and other features, aspects, and advantages will become more apparent from the following detailed description when read in conjunction with the following drawings, wherein:

FIGS. 5-13 are exemplary screen shots of the exemplary Web-based help application of FIG. 4.

DETAILED DESCRIPTION OF THE PRESENTLY PREFERRED EMBODIMENTS

Figure 1:
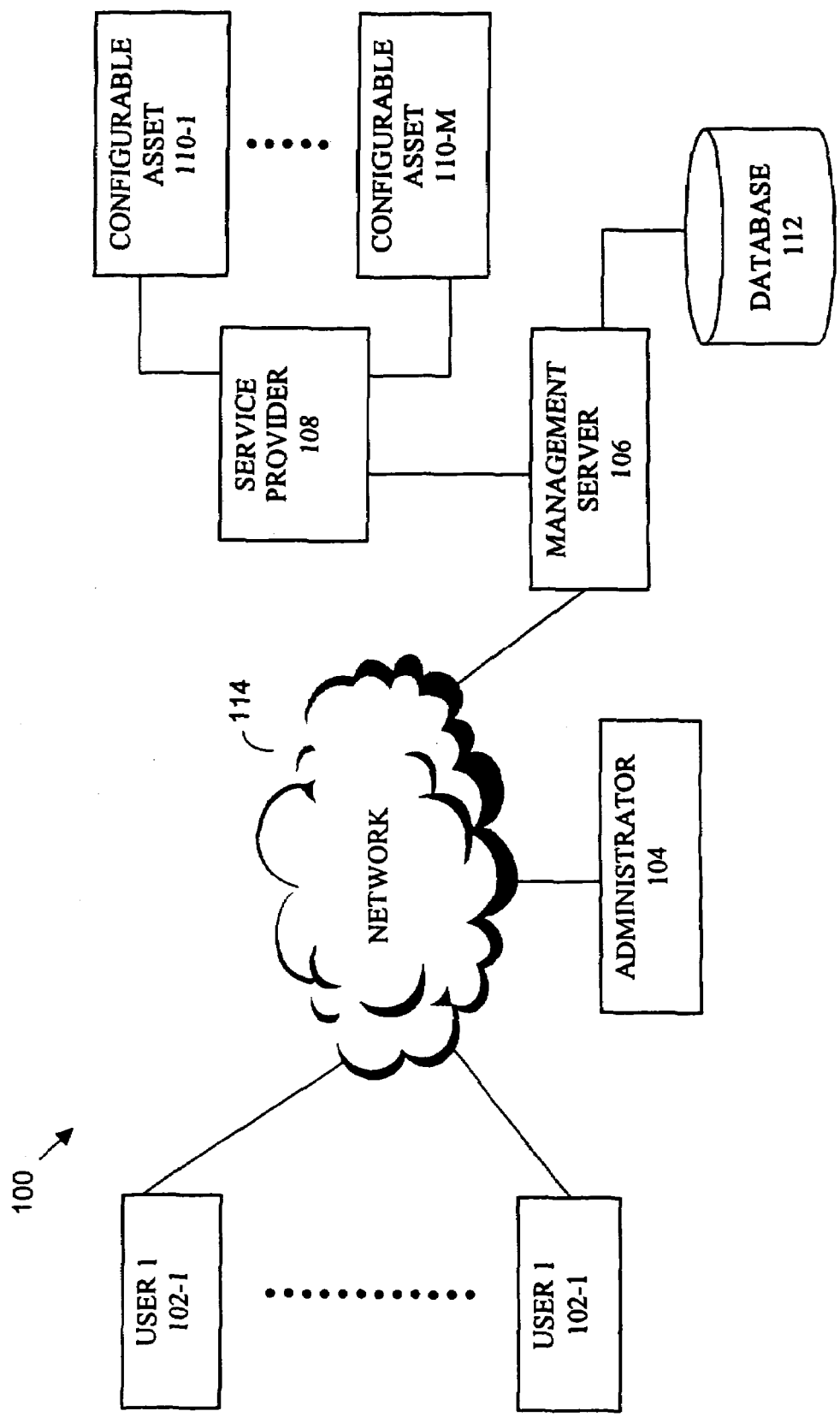
FIG. 1 is a diagram illustrating a high-level exemplary perspective of a the structure of an exemplary distributed system according to a presently preferred embodiment.

The present invention provides a system in which a user can login to a World Wide Web server's (Web) application page and get help on the features assigned to an instrument such as a telephone or a service such as a voicemail system that is a configurable asset specifically assigned to that user. The on-line help is preferably kept in text and/or multimedia format on a server. The entity or that is displaying the help information is preferably a different entity than the service provider device that is providing the functionality or service to the asset. A synchronization process occurs so that the server providing the Web-based help has a database of features assigned to the user as well as other information about the user. In the example of a digital telephone set, a user may have multiple keys on the set assigned to various features such as a transfer key or a conference key. Other features may be assigned to a soft key. As is known in the art, a soft key is a key that can be programmed, i.e. a soft key is not a static key that has a fixed functionality. Still other features may not be assigned to any key but would have an impact on how that set can operate. An example of such a feature would be a class of service assignment that defines what dialing permissions a user may have. On-line Web-based help would benefit any user who needed to know more about how the telephone instrument feature operates. An additional example of help from yet another server would be voicemail services. If a user needed to know how to build specialized dialing menus for a particular list of callers and was allowed to build such menus, on-line Web-based help could be useful. A unique aspect of this invention is that the user would only see and have access to the features that they are assigned. Web server functionality preferably synchronizes the data from service provider systems or other devices that control entities that can be considered assets of that user. The user selects feature help, wherever possible, from a Web page that displays the keys associated with the users features.

An example of access help on a telephone set would be as follows. A user selects a URL that gets them to a login page. The user logs into a server that provides Web based help by name or other ID. The server presents a Web page allowing the user to select the instrument or service they would like help on. One option would be to show a default instrument such as a telephone in the first view. The Web page would display a visual representation of their telephone set with the keys visually laid out just like they see on their actual telephone set. If the user wanted help on how to use their conference key they would, for example, click on the key, right click on the key and select a help button, or hold down the mouse over the key and select a help button, which would link to the user to Web based help on the conference feature. Help can be text based. The help text can be specifically modified by an administrator. Also, help could be multimedia help and include sound, images, and animated simulations of using the conference feature.

Ultimately, the presently preferred embodiments of the present invention allow an end user to get up-to-date help information that is specific to their configured features and services easier and faster. The embodiments also reduce the workload of an administrator who the end user might otherwise call for help.

The present invention will now be described in detail with reference to the accompanying drawings, which are provided as illustrative examples of preferred embodiments of the present invention.

Referring now to FIG. 1, it is a diagram illustrating a distributed system 100, such as a distributed communications system, according to a presently preferred embodiment in which users 102-1, . . . , 102-N communicate via a network 114 and Web interfaces. A Web interface may include, for example, a computer loaded with a Web browser and email software. The system 100 further includes a service provider 108 that provides services to and controls several configurable assets 110-1, . . . , 110-M coupled to the service provider 108. Although one service provider 108 is illustrated in FIG. 1, the system 100 is not limited to one service provider and any number of service providers, with any number of associated configurable assets, may be used as suitable. In a preferred embodiment, the service provider 108 is a telephone switch and provides services such as private branch exchange (PBX) and voicemail functionality, for example. In a preferred embodiment the configurable assets 110-1, . . . , 110-M are telephone equipment. In a preferred embodiment, the telephone equipment is implemented as digital telephone sets such as Meridian digital telephones from Nortel Networks, although any suitable telephone equipment may be used. In a preferred embodiment, the network 114 includes local area networks (LANs) and a wide area network (WAN). Of course, the network 114 is not limited to a LAN/WAN and may include an intranet, the public Internet, any suitable network, or any suitable combination of networks in addition to, or instead of a LAN or a WAN. As shown in FIG. 1, the assets 110-1, . . . , 110-M may have different features one from the other. A management server 106 is coupled to the service provider 108 to configure the service provider 108, typically in accordance with settings supplied by an administrator 104. The administrator 104 communicates with the management server 106 via the network 114. In a preferred embodiment, the management server 106 is a telephony manager. In a preferred exemplary embodiment, the telephony manager is implemented as an OTM management server from Nortel Networks. In a preferred embodiment, the management server 106 is implemented as, for example, a Windows NT server, and includes Web server functionality. The management server 106 also maintains a database 112, which can include, for example, a list that itemizes which assets 110-1, . . . 110-M are associated with respective users 102-1, . . . , 102-N. Although in FIG. 1 the database 112 is illustrated as being external to the management server 106, in other embodiments the database is physically incorporated into the management server. Although in FIG. 1, the asset 110-1 may be inferred to be associated with the user 102-1 and the asset 110-M may be inferred to be associated with the user 102-N, it is not necessary that a user be associated with a single asset or that a single asset be associated with a single user. Rather, a single user may be associated with several assets, and a single asset can be associated with several users. The database 112 also preferably stores descriptions of features of each of assets 110-1, . . . , 110-M, as well as instructions on how to use such features. The descriptions of features may be in the form of, for example, text information, pictures, multimedia presentations, or any suitable media. The instructions may be in the form of, for example, text information, pictures, multimedia presentations, or any suitable media.

Preferably, Web server functionality within the management server 106 synchronizes the database 112 with the service provider device 108 providing end user functionality. For example, the service provider 108 implemented as a telephone switch with PBX functionality providing telephone services through an asset such as a telephone instrument or even a Web based browser. The management server 106 tracks the assets 110-1, . . . , 110-M, the users 102-1, . . . , 102-N assigned to these assets 110-1, . . . , 110-M, and features enabled on these assets 110-1, . . . , 110-M. When an end user 102 logs onto the Web server, they can view the assets 110 assigned to them. If the asset 110 is a telephone, the end user 102 sees a visual representation of the telephone. If the telephone has multiple function keys with assigned features, the user 102 preferably sees a visual representation of these keys and features. Other features may control different aspects of how the instrument or asset operates, but these features might not have a specific key associated with them. Preferably, these features may also be accessed from a list viewable on the Web browser of the end user 102.

In one implementation of the invention, the user interface provided by Web server functionality within the management server 106 has several views of the asset and its features. Preferably, the user 102 can highlight any of these visible representations of specific features and can obtain help information on the specific feature either through the mouse operation or a menu. Preferably, the help information is text based and is capable of being edited by the administrator 104. Another representation of the help information can be presented by playing a multimedia file that may include video, animation, screencam, sound, additional embedded help specifically related to the feature, links to yet other Web servers that may provide further information, or a combination of any of these mentioned elements.

The help files maintained in the database 112 by the Web server in the management server 106 may include a much greater help library in terms of features than may actually be accessed in the particular assets 110-1, . . . , 110-M configured for the system 100. Part of the information that is synchronized, therefore, also includes the identification of the asset, the installed software release or the version of the asset, and the features installed and enabled on the asset. Preferably, where certain features are keycode enabled, help information is not presented to an end user if the feature is not turned on in the keycode. In effect, the Web-based help itself is keycoded in this implementation.

Another implementation of user specific Web-based help is in a home network environment. In this instance, a Web-based help server preferably has the capability of automatically discovering which assets are installed on a home subnetwork. Such assets might include, but not be limited to, kitchen appliances, stereo equipment, video and television equipment, game systems, heating control equipment, telephone equipment, personal computers, cable services access box, and lighting and environmental control systems. With each of these assets, there may be a potential for different user access permissions and therefore, a need for providing user specific online help capabilities. An implementation of user specific on-line help in this configuration preferably includes collecting asset information and downloading help files on the installed assets from a Web location. The information downloaded may include any variety of information, such as help information, warranty information, and URLs linked to other content, for example. Such an implementation may suggest the need to define a standard to which multiple vendors could subscribe to in order to provide user specific Web based help for a multitude of products.

Figure 2:
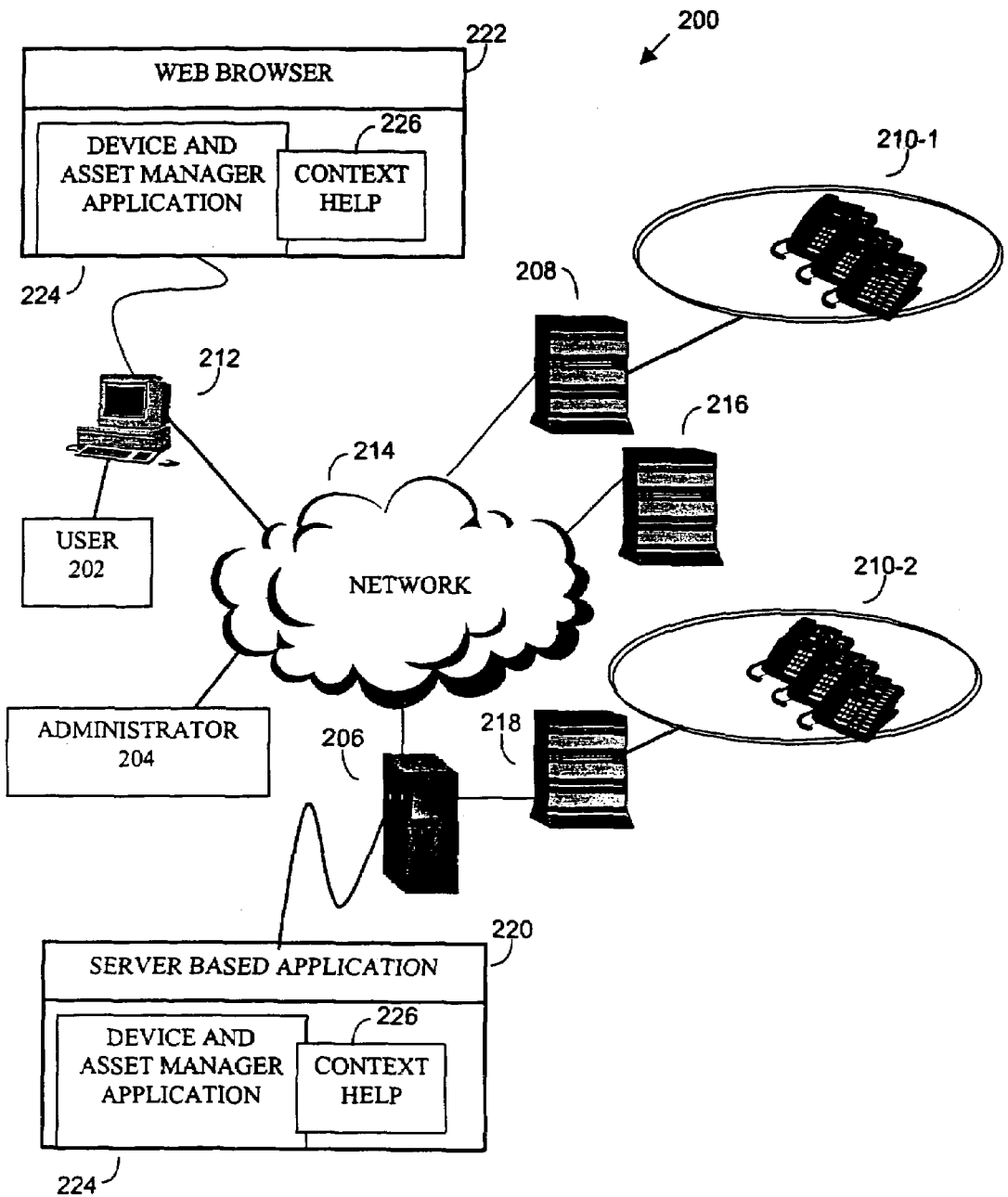
FIG. 2 is a diagram illustrating an exemplary system in accordance with the distributed system of FIG. 1.

Referring now to FIG. 2, it is a diagram illustrating an exemplary system 200 in accordance with the distributed system 100 of FIG. 1. The system 200 includes a network 214 and a management server 206. Service provider devices, for example, PBXs 208, 216 are connected to the network 214. A service provider device, for example, a PBX 218 is coupled to the management server 206. The PBX 208 services and preferably controls a group of configurable assets, for example, telephone equipment sets 210-1, coupled to the PBX 208. The PBX 218 services and preferably controls a group of configurable assets, for example, telephone equipment sets 210-2, coupled to the PBX 218. In a preferred embodiment, the telephone equipment sets 210-1, 210-2 are implemented as digital telephone sets such as Meridian digital telephones from Nortel Networks, although any suitable telephone equipment may be used. The PBXs 218, 208, 216 of FIG. 2 can be, for example, MERIDIAN 1 systems from Nortel Networks, although any exchanges may be used as suitable. Although three service provider devices are illustrated as one particular type of device, a PBX, in FIG. 2, the system 200 is not limited to one type of service provider device nor to three service provider devices, and any particular number of service providers, being of any suitable type, and having any suitable number of associated configurable assets, may be used as suitable. A user 202 communicates with the management server 206 via the network 214 using a Web interface, such as a Web browser 222 running on a computer 212. In a preferred embodiment, the network 214 includes local area networks (LANs) and a wide area network (WAN). Of course, the network 214 is not limited to a LAN/WAN and an intranet, the public Internet, any suitable network, or any suitable combination of networks in addition to, or instead of a LAN or a WAN.

The telephone equipment sets 210-1, 210-2 may have different features one from the other. The management server 206 is coupled to the PBX 218 and the PBXs 208, 216 via the network 214 to configure the PBXs 218, 208, 216, typically in accordance with settings supplied by an administrator 204. The administrator 204 communicates with the management server 206 via the network 214. In a preferred embodiment, the management server 206 is a telephony manager. In a preferred exemplary embodiment, the telephony manager is implemented as an OTM management server from Nortel Networks. In a preferred embodiment, the management server 206 is implemented as, for example, a Windows NT server, and includes Web server functionality. Although one user 202 is illustrated in FIG. 2, the system 202 is not limited to one user, and may accommodate any number of users as suitable. It is not necessary that a user be associated with a single asset, such as a telephone of the telephone equipment sets 210-1, 210-2 or that a single asset be associated with a single user. Rather, a single user may be associated with several assets, and a single asset can be associated with several users. A device and asset manager application 224 with associated context help 226 runs on the management server 206 as a server based application 220 and may be accessed by the user 202 at the Web browser 222. Similarly, the administrator 204 may communicate with the management server 206 and may utilize the application 224 to, for example, configure the context help 226.

The Management Server

Figure 3:
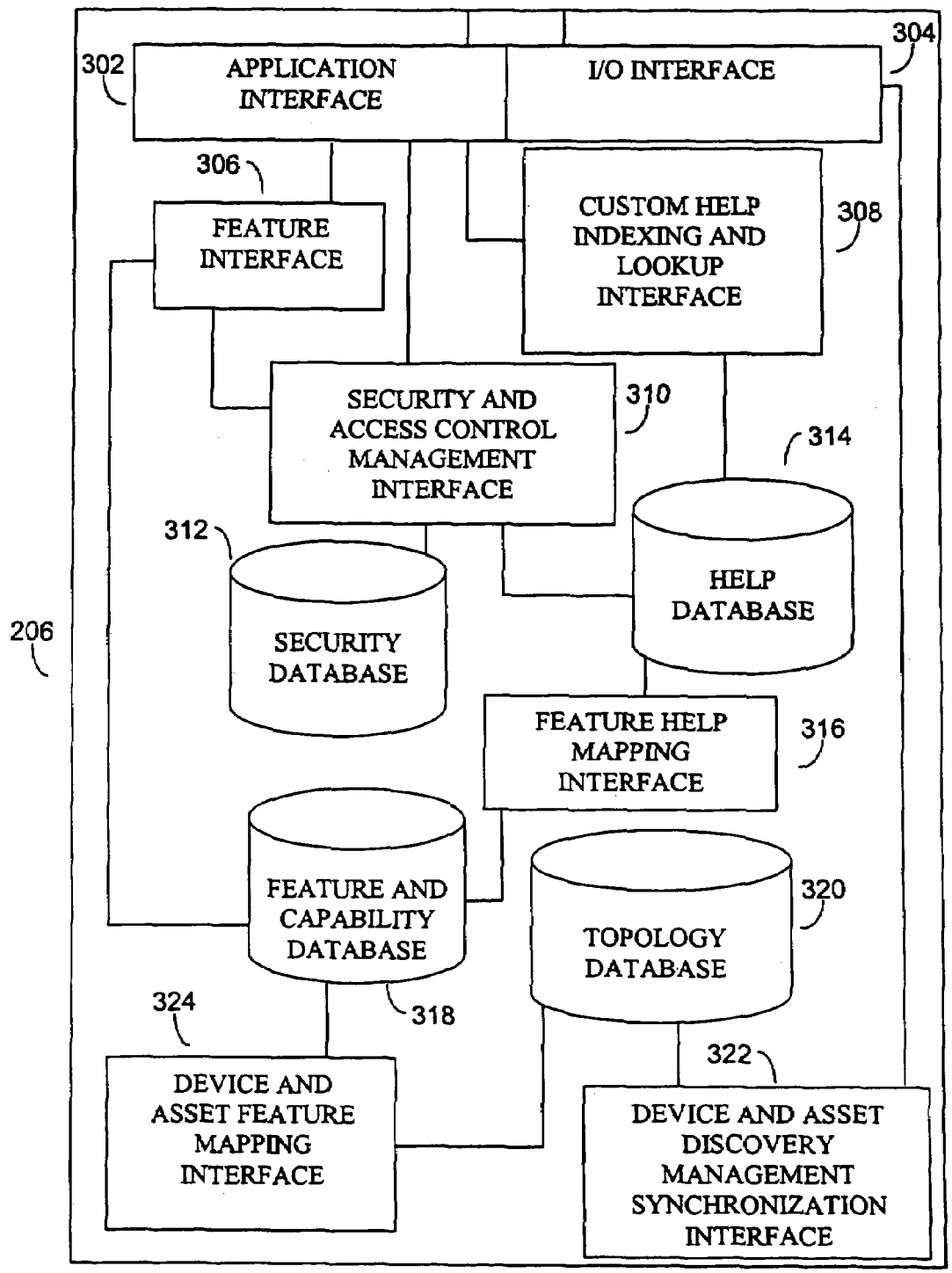
FIG. 3 is a diagram illustrating an exemplary embodiment of the management server of FIG. 2.

Referring now to FIG. 3, it is a diagram illustrating FIG. 3 an exemplary embodiment of the management server 206 of FIG. 2. In a preferred embodiment, the management server 206 is a telephony manager. In a preferred exemplary embodiment, the telephony manager is implemented as an OTM management server from Nortel Networks. Of course, it should be understood that the management server 206 is one example of a management server and other management server arrangements and functions may be used. FIGS. 4-13 are described for exemplary purposes to demonstrate aspects of the present invention, particularly with reference to the OTM management server, although the embodiments of the help information systems and methods described herein are not limited to the OTM management server and any suitable management server may be used. The exemplary management server 206 includes an application interface 302, an input/output (I/O) interface 304, a feature interface 306, a custom help indexing and lookup interface 308, a security and access control management interface 310, a security database 312, a help database 314, a feature help mapping interface 316, a feature and capability database 318, a topology database 320, a device and asset discovery management synchronization interface 322, and a device and asset feature mapping interface 324. The I/O interface 304 and the application interface 302 are interfaces through which the management server 206 communicates with connected devices and assets. A user may communicate the management server 206 via the application interface 302.

The security database 312 stores access control lists (ACLs) and security hierarchy information. The I/O interface 304 represents an input and output interface of the management server 206. The I/O interface 304 preferably can form a variety of wireless and wired connections with other entities. For example, preferably the I/O interface 304 is capable of connecting to the internet 106. The I/O interface 304 of the generic exemplary management server 206 preferably communicates with service provider devices and assets, for example. In a preferred embodiment, the I/O interface 304 includes a network interface card.

The management server 206 preferably performs a network discovery function. The management server 206 network discovery function is carried out by the device and asset discovery management synchronization interface 322. The device and asset discovery management synchronization interface 322 communicates with the surrounding network via the I/O interface 304 to browse the network to discover the existing network topology. The network topology preferably serves as a schematic or blueprint of the service provider devices and assets present on the network. The device and asset discovery management synchronization interface 322 forwards the discovered network topology to the topology database 320. The topology database 320 stores the network topology.

Device and Asset Discovery

Management applications typically are structured according to a manager-agent model. The agents reside in the network devices and assets, which provide the management information base (MIB) objects. The MIB objects provide performance and configuration information for the asset. The MIB objects are preferably accessed via the Simple Network Management Protocol (SNMP).

The device and asset discovery management synchronization interface 322 on the management server 206 discovers the physical network consisting of devices and assets, including interconnected devices, assets, and links. Generally, the process of discovery is dependent on the type of management server that is used. For example, on the OTM management server and the OPTIVITY Network Management System, the device and asset discovery management synchronization interface includes the following main features:

Layer 3 (Network Layer) discovery of Internet Protocol (IP) devices and assets with SNMP MIB-II support.

Discovery of associated subnetworks.

Layer 2 (Data Link Layer) discovery of devices and assets based on the Bridge MIB.

Precise definition of a particular network area of interest based on a set of discovery filters.

Discovery based on a seed file. The seed file includes information regarding which devices, IP ranges, or specific IP addresses are to be discovered and which are not to be discovered.

Capability to plug-in network devices and assets that cannot be discovered by other means.

Network Topology Information

The device and asset discovery management synchronization interface 322 on the management server 206 forwards the discovery information regarding network topology to the topology database 320 where the topology information is stored. A set of rules associated with the network topology information are stored in the topology database 320 on the management server 206. The network topology information and associated rules are used to visualize the network topology by the management server 206.

Security Database

A user's position in the security hierarchy is preferably used to determine the user's privileges and access permissions to device and assets on a network. For example, a network administrator for a company preferably has access to monitor, view and manage the entire network. These same permissions translate to the access rights the administrator receives when the administrator is remotely connected to the management server. As a further example, an end user might have minimum level permissions and might be able to program only certain features on the user's telephone set, for example.

The actual security hierarchy information is dependent on the security policy defined by the administrator of that network. The security hierarchy information is preferably stored in the security database 312. In some instances, the actual security hierarchy will largely reflect an organizational hierarchy of the company, but the degree to which these hierarchies coincide will preferably depend on the security policies in place.

In its simplest form this security hierarchy information can be locally available through the account information stored in the operating system of the management server 206. In some smaller networked systems, the security rights and user privilege levels defined for network managers on the local operating system may be used by the management server 206 to map to the access rights to the devices and assets being managed.

Preferably, the management server 206 is capable of synchronizing the security database 312 with an externally available security information provider entity such as a domain controller or a Lightweight Directory Access Protocol (LDAP) server. In this manner the hierarchy and security information is preferably controlled in a central location, typically in accordance with policies set by the company's Human Resources and Information Services departments respectively, and is preferably propagated and translated into network management access permissions by the management server 206.

Access Control Lists

The security database 312 stores access control lists (ACLs) on the exemplary management server 206. Access control lists (ACLs) are created on the management server 206 to translate security hierarchy policies into access privileges and permissions for specific device and assets such as entities and links between entities. Preferably, every device and asset that is catalogued in some respect in the topology database 320 on the management server 206 is assigned a corresponding ACL.

Using the ACLs the administrator can introduce finer levels of control over access permissions to the features and capabilities for each of the devices and assets.

An important aspect of the present invention is to provide a dynamic help system that supports devices and assets, for example, applications, that may change their behavior dynamically through direct or indirect programmatic changes to their configuration.

The management server 206 adds discovered devices and assets to the topology database 320. The devices and assets may be discovered directly, or through the use of other helper applications and agents. The administrator 204 may manually add the devices and assets as well through a user interface, for example.

The PBXs 208, 218 provide voice communication services to the telephone equipment sets 210-1, 210-2 connected to them. The telephones within these sets 210-1, 210-2 are examples of assets, since the telephones are instruments used and owned by subscribers.

These network service providers and the individually-owned assets that obtain service from them support a set of configurable services and features. The device and asset feature mapping interface 324 is preferably responsible for mapping the device and asset types to the appropriate feature set within the feature and capability database 318. In this way, preferably all of the attributes of a device or an asset are thus available to users of applications that wish to view, reconfigure or map the device or asset to other relevant elements, such as the help database 314.

Whenever the features on a device or assets are changed or reprogrammed, the feature and capability database 318 changes appropriately to reflect the changes in the actual device or asset. In a preferred embodiment, the applications that manipulate the feature and capabilities of the devices and assets may change or reprogram features by changing values in the feature and capability database 318. In other embodiments, the applications directly apply the changes to the devices or assets themselves, or the devices or assets have their own simple interfaces that allow users or administrators to make changes. For example, the telephone keypad can be used to make simple programming changes to the service, or the service provider device such as a PBX can support a simple Telnet type command line interface (CLI) to allow direct changes.

Features may be enabled or disabled on particular devices and assets. For example, on a Meridian 1 PBX from Nortel Networks, Internet Telephony Gateway plug in modules are supported, but a customer might not have installed the modules. Therefore, the feature modules on the PBX are not enabled. The feature and capability database 318 of enabled features and configured devices and/or assets is updated with the actual real time data periodically with the actual data on the service provider device, such as a telephone switch. These updates may happen on scheduled intervals or when the change takes place, as programmed by the administrator.

So at any given point of time the system has a mapping established between the capabilities a device and/or an asset can support and what is actually working and running, and in what manner, on the device and/or the asset. The help system uses this information to determine, dynamically, what the behavior of the feature set is—even when these devices and/or assets are interacting with other devices and/or assets programmed in a similar or differing manner—and how best to describe its behavior to the user or the administrator who has to use or program these features.

The help database 314, i.e., the repository on the file system as described later, can be a directory hierarchy of help files arranged in a format relevant to the hierarchy of devices, assets, and/or application logic and programmed into indexed lookups. This database also contains the annotated and customized files created by the administrator.

It should be understood that customization and annotation is not the only objective this application serves. As can be readily observed this application can be applied in any situation where a dynamically changing environment has to be reflected in the help and user guides to enable the appropriate context sensitive, secure and customizable help for the users and administrators of the system.

When a user application requests a help file, for example, a context sensitive look up on help to program a key on a telephone, the custom help indexing and lookup interface 308 dynamically derives the appropriate help text from the help database 314. This process is subject to the conditions and filters imposed by the following main sub systems:

The security and access control management interface 310 determines not only if the user has access to the application requesting the file, but also if the feature in question is available for the user to either use, view or program.

The feature help mapping interface 316 ensures that the correct dynamic mapping exists between the device's and/or the asset's capabilities and the relevant feature help sub sections.

The device and asset feature mapping interface 324 ensures that the devices and/or the assets have been properly identified and that maps to the correct feature set are currently being supported by the devices and/or assets.

The device and asset discovery management and synchronization interface 322 is responsible for updating the database 320 with dynamic information about network activities resulting in devices and/or assets being added or removed—this also includes sub devices and/or assets such as interface cards being added or removed from the main device and/or asset—or reprogrammed to support different set of features causing a change in the feature set or its behavior.

The application interface is included to depict the complete relationship in a working example to show how a client application runs from a server that supports the help system capable of providing dynamic help capabilities to the application.

It should be understood that even though the help as depicted here resides on the OTM management server, which is also the network manager for the telecom switches, this system is flexible enough to be set up on an independent server responsible to providing distributed help support for network or standalone server applications.

Customizable Help for the OTM Management Server

Figure 4:
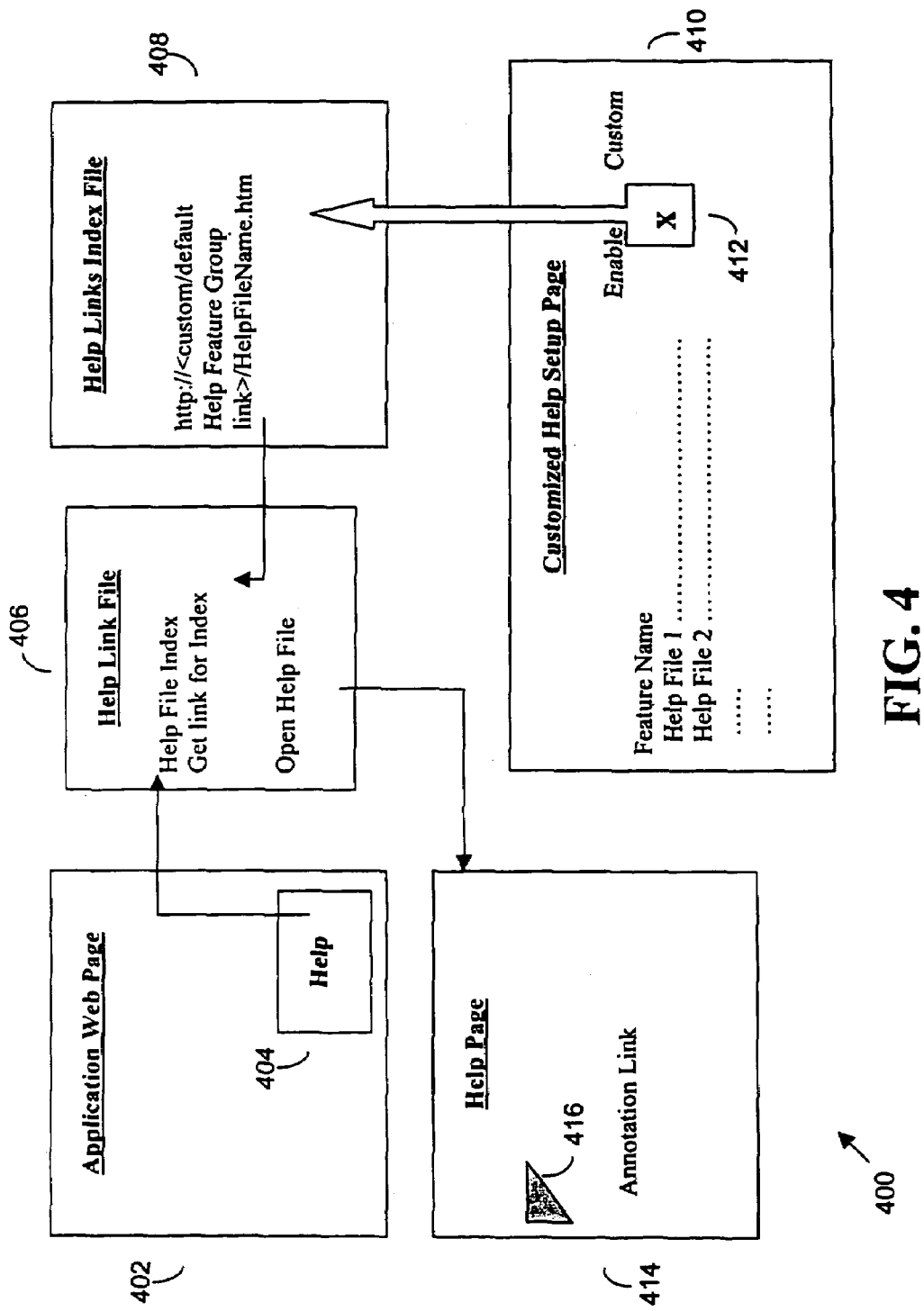
FIG. 4 is a diagram illustrating an exemplary flow of an exemplary Web-based help application according to the exemplary management server of FIG. 3.

The help information system provides help to a user subject to the ever changing system capabilities and configuration of a dynamic environment. The following description of customizable help applies to a preferred embodiment and is included for purposes of explanation, rather than limitation. FIG. 4 is a diagram illustrating an exemplary flow 400 of an exemplary Web-based help application according to the exemplary management server of FIG. 3.

Functional Overview

Custom help for the OTM management server was created to grant administrators the ability to customize the help files for end users. An administrator for an OTM management server preferably has the capability to:
1. create and define customized help pages for the end users of the administrator's Web site,
2. add annotations to existing help pages, and
3. enable or disable customized help availability for the end user.

More specifically, an administrator is preferably capable of manipulating files such that an administrator can:
1. copy a help file to custom help,
2. delete a help file from custom help,
3. enable a custom help file,
4. disable a custom help file,
5. add an annotation to a custom help file,
6. delete an existing annotation to a custom help file, and
7. edit an existing annotation to a custom help file.

An end user is able to view the customized help defined by the administrator, subject to user privileges, by clicking on a help button 404 on a application web page 402. The end user is presented with visual indication 416 on the help pages 414 indicating the existence of annotations. The end user is able to view the annotations by clicking on the annotation button 416. The help mechanism also supports showing of animated help. In a preferred embodiment, a Show Demo button appears on the help page if animated help files are available for the help topic.

Help Files Organization

The help files are organized on the OTM management server in the following hierarchy:

Help
  Eng [English]
  DefaultHelp
    <ApplicationHelpGroup1>
      <AppSubHelpGroup1>
        Help files belonging to the group, e.g. KeyHelp.html
        Help Links Index file for the group, e.g. toc.hhc and index.hhk
        ShowDemo
        ShowDemo files corresponding to the group's Animated help files, e.g. KeyHelp.dir [absence of this file indicates no animated demo for KeyHelp.html]
      <AppSubHelpGroup2>
    <ApplicationHelpGroup2>
  CustomHelp
    <ApplicationHelpGroup1>
      AppSubHelpGroup 1
        Annotation
        Annotation files corresponding to the group's Help files, e.g. KeyHelp.ann [absence of this file indicates no annotation for KeyHelp.html]
  Fr [French]
  De [German]

Defining Custom Help

A customized help setup page 410 is preferably provided for the administrator to manage custom help and annotation.

The administrator selects the help feature group from a drop down list. This then displays the list of files present for this group. The group is the help feature sub directory containing the index and help files, organized according to the directory structure shown above. The file list pertaining to the group is obtained from the index file 408. If there are multiple languages installed there is a drop down list of languages for the administrator to select.

The administrator copies the help files that need to be modified for custom help into the custom help folders from the Web interface.

These files can then be opened for editing and saved back to their custom folders from the Web.

The administrator can then enable custom help usage by checking a box 412 next to the help file name. Note that the administrator preferably must have write access rights to the help files in order to be able to save the edited files. Editing custom help files is preferably done on the OTM management server and not remotely via the Web.

Enabling the custom help causes all subsequent requests, for the affected Help file, to be redirected to the custom help folders instead of the default ones.

Defining Annotations

The administrator clicks on the annotate option on the Web interface to add or edit annotations to a help file.

The end user sees an annotation icon (a paperclip) 416 on the top of the help file that has annotations. Clicking on this button 416 opens up the annotations file.

Show Demo

The Show Demo button appears in the help file if an animated help is installed for the help topic (a file in the ShowDemo folder with the same name as the help topic). Preferably, no administration action is necessary to enable the Show Demo button.

Customizable Web Help Design

The help index and table of contents files are initially generated automatically by a help authoring tool. A help setup Web page 410 is available for the administrator to enable custom help for a help topic, and manage help annotation. The asp code behind the help setup page 410 modifies the index and help files accordingly.

FIG. 4 illustrates the basic design of the exemplary Web help system.

1. All end user help page requests go through a help links html/asp file 406. The language selection by the user determines which set of help files to retrieve.

2. This file reads the URLs, from the help links index file 408, that are used to switch from default help to custom help and back.

3. With the help setup Web page 410 the administrator enables 412 custom help for a help topic. The help links index file 408 is written when the custom enable check box 412, next to the custom help feature name, is selected.

4. Annotations are files with the same name as the help file but with an extension of .ann. They reside in the corresponding annotation files directory. Preferably, annotated help files reside under the custom help folder in order to prevent the loss of these files during upgrades or re-installations of the OTM management server.

5. The annotated help file is saved by the Web interface with an embedded icon 416 and corresponding link to the help file. A special tag <!—annotation> is preferably used to tag the link (ahref) so that annotation can be removed by the administration page.

6. This annotation button 416 can be clicked by the end user to bring up the annotation pages.

7. Upon installation of animated help files, the Show Demo button is added to the corresponding help file. Adding the links to demos can be a manual process after help is generated. Preferably, a tool checks what is installed in the ShowDemo folder and the tool adds the link to the individual help files.

The help links index file 408 is initially generated automatically by the help authoring tools. The customizable help application later on modifies the index links to point them to custom or default help. Applications like Terminal Client query this file with the help index to get the help file link to point to.

The help setup page 410 preferably has two parts. The first part presents a list of top level application help groups, as read in from the top level index file. Drilling down further the administrator is led to the customizable help setup pages for the AppSubHelpGroup.

Customized Help Setup Pages 410

First Page Content

1. Feature list (list of top level application help groups)

2. Selecting a feature from the above list populates a list of sub help groups.

3. Selecting one of the sub help groups and pressing next takes the administrator to the next page.

Second Page Content

1. The second page is the same as the page 410 displayed in FIG. 4, except that the second page reflects files for the sub group instead of the top level help group.

2. In addition, the second page preferably has a drop down selection list to toggle between supported languages (English, French, for example)

Exemplary Screen Shots

FIGS. 5-13 are exemplary screen shots of the exemplary Web-based help application of FIG. 4.

This describes the Customizable Help Application's user interface in the OTM management server for Meridian 1 from Nortel Networks.

Figure 5:
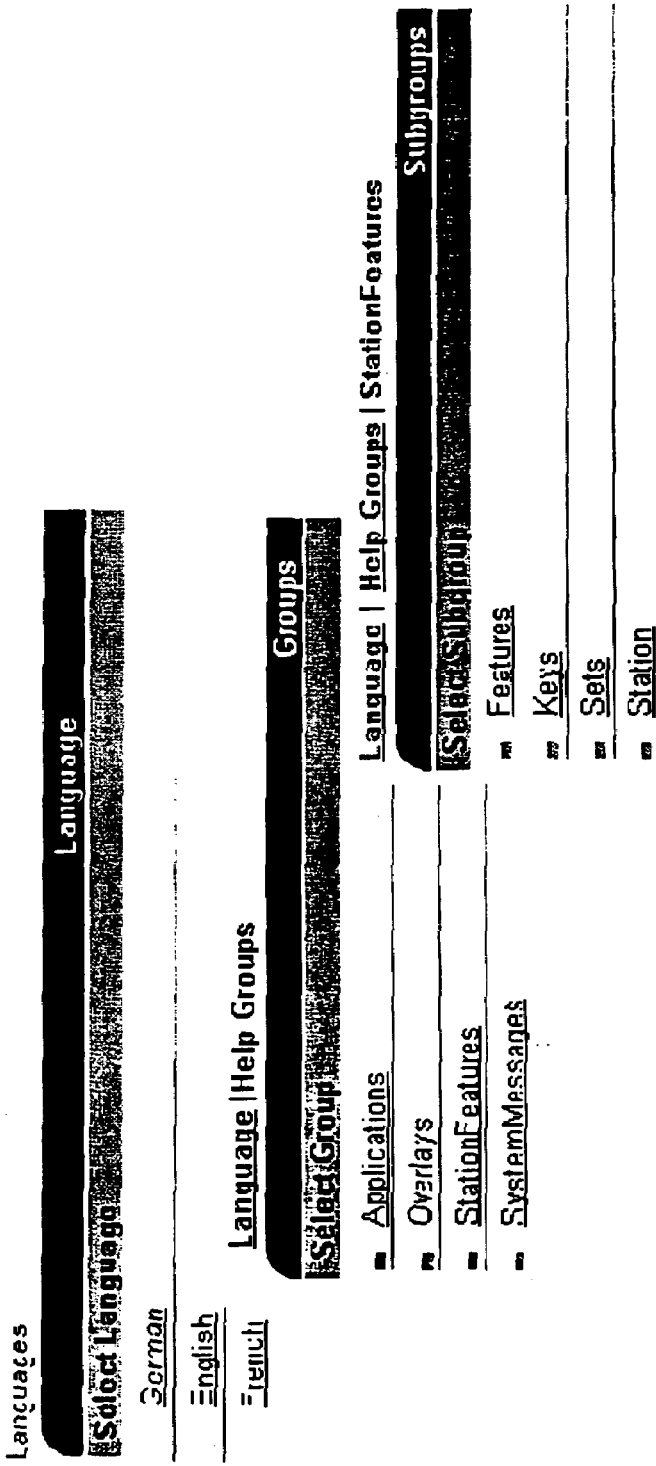

Referring to FIG. 5, it is an exemplary screen shot 500 showing file system hierarchies. The help text for Web applications running on the OTM management server is organized in File System Hierarchical Sections based on Language, Applications and Application Sub Groups. For example the help for System Error Messages in German would be organized in the following manner German SystemMessages Meridian1 [the affected service provider device]

SRPT4619 [the error code]

Referring to FIG. 6, it is an exemplary screen shot 600 of a customized help setup page, such as the customized help setup page 410 of FIG. 4. The Customizable Web Help Application includes a server component that interfaces with the Web Application Server's help file system to reflect the organization of the help guides to the remote Web Browser's User Interface. Using this intuitive graphical user interface shown in 600, the administrators of the Web Application Server can customize and annotate specific help files to provide a custom help environment for the Web Application users.

Preferably, the customized or annotated files are stored in a separate file system in order that they do not get overwritten during a software re-install or an upgrade. The file system for storing customized files is a mirror of the default file system shown above. It resides in a separate hierarchical root so that it is isolated from the default storage section.

Preferably, enabling the custom help for a particular help file causes all subsequent requests for the particular help file, to be redirected to the custom help folders instead of the default ones. The custom help indexing and lookup interface 308 of FIG. 3 preferably ensures that the correct help files and text are picked up when a user application requests them.

Figure 7:

Referring to FIG. 7, it is an exemplary screen shot 700 of the OTM management server's Web Alarm Browser. The exemplary system alarms demonstrate how a network monitoring application like the Web Alarm Browser can interface with the Help system to display context sensitive, customized help on the error codes of various networking devices.

Figure 8:
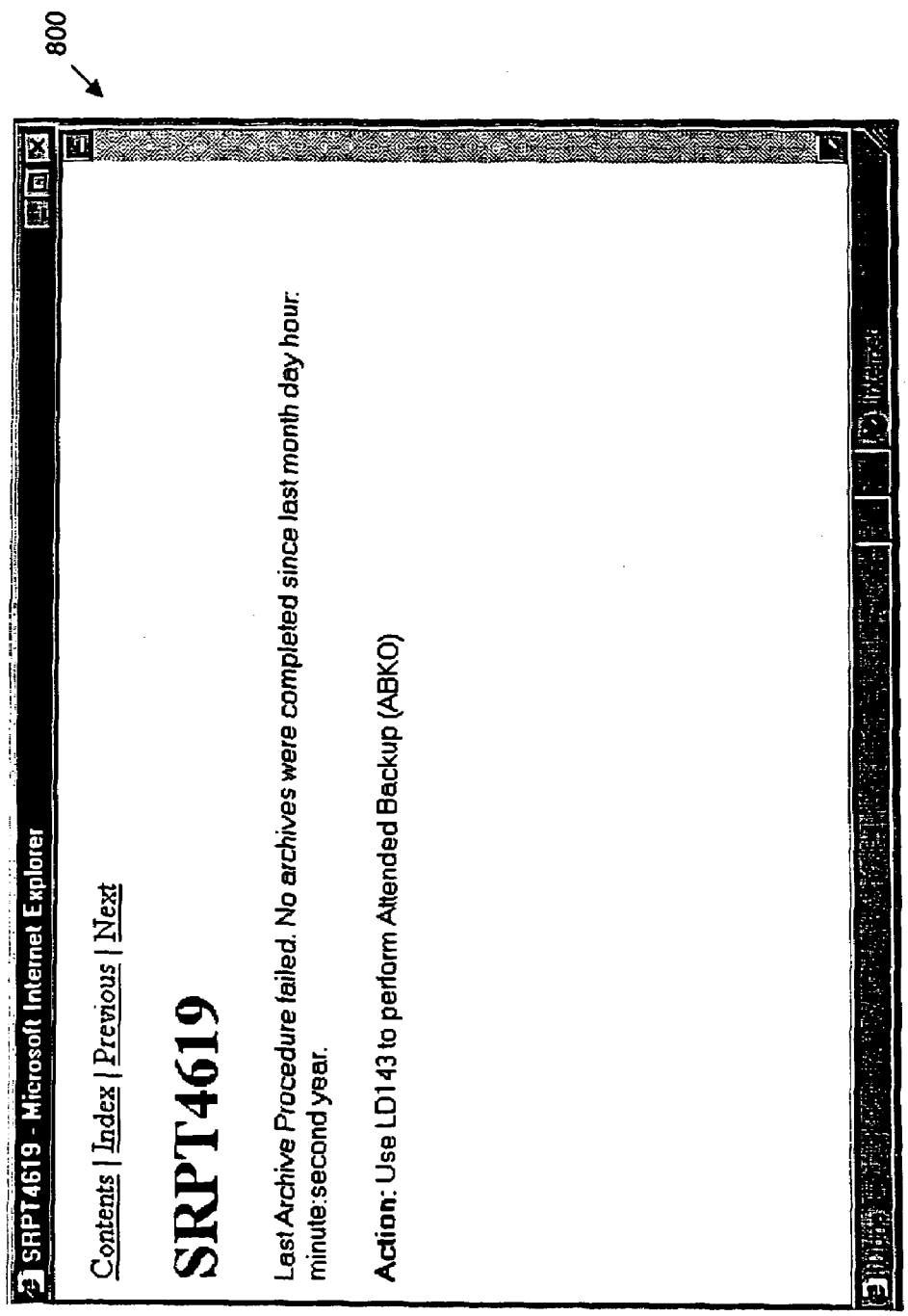

The error codes in this case are extracted from well defined Simple Network Management Protocol (SNMP) traps, however the error codes can be part of any SNMP or ASCII text alarm received from a variety of devices, assets, or applications. FIG. 8 is an exemplary screen shot 800 of an exemplary error code message, SRPT 4619.

The user of this Web Alarm Browser of FIG. 7 simply selects the alarm entry to bring up the help and troubleshooting text, as in FIG. 8, for example, that guides the user in solving the problem on the network device. As this help is not generic in nature, but tailored to the specifics of the device and its environment, a network technician does not have to wade through hundreds of pages of specification and feature manuals in order to troubleshoot and fix the problem.

Since the administrator can also customize the help text further to include things like the suggested, or actual, solution to a particular network problem, the time required to bring the network back to full working status is potentially tremendously reduced. The solutions found are also reliably made available to the entire network management team through a common, integrated and consistent source.

The knowledge base thus developed is materially very valuable for administration and for guaranteeing the uptime of a large and complex network and its devices and assets.

Figure 9:
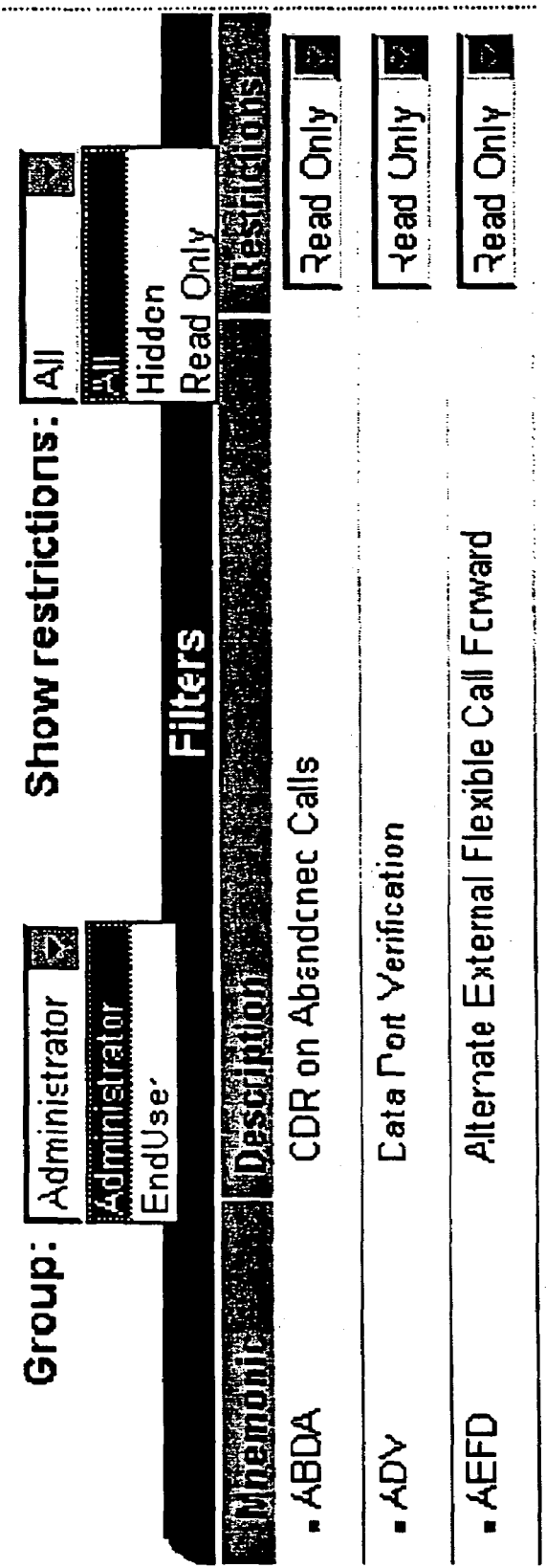

Referring now to FIG. 9, it is an exemplary screen shot 900 of the User Filters Web application of the OTM management server. Users of telephone equipment can login to the Web server functionality on the OTM management server to view the configuration of their telephone and further customize the features of the telephone set. The help texts generated for the users of these applications are context sensitive to the networking devices that provide services to the assets that these users avail services through.

The users have access to view and configure service features depending on the capabilities programmed into the service provider device as well as the features the user has been given access to by the administrators. Shown in FIG. 9 is the User Filters Web application of the OTM management server that is used by the administrators to grant access rights to features supported by the user's telephones. Note that the features have already been defined, and can dynamically change, based on the programming of the service provider device, for example a telecommunications switch.

Figure 10:
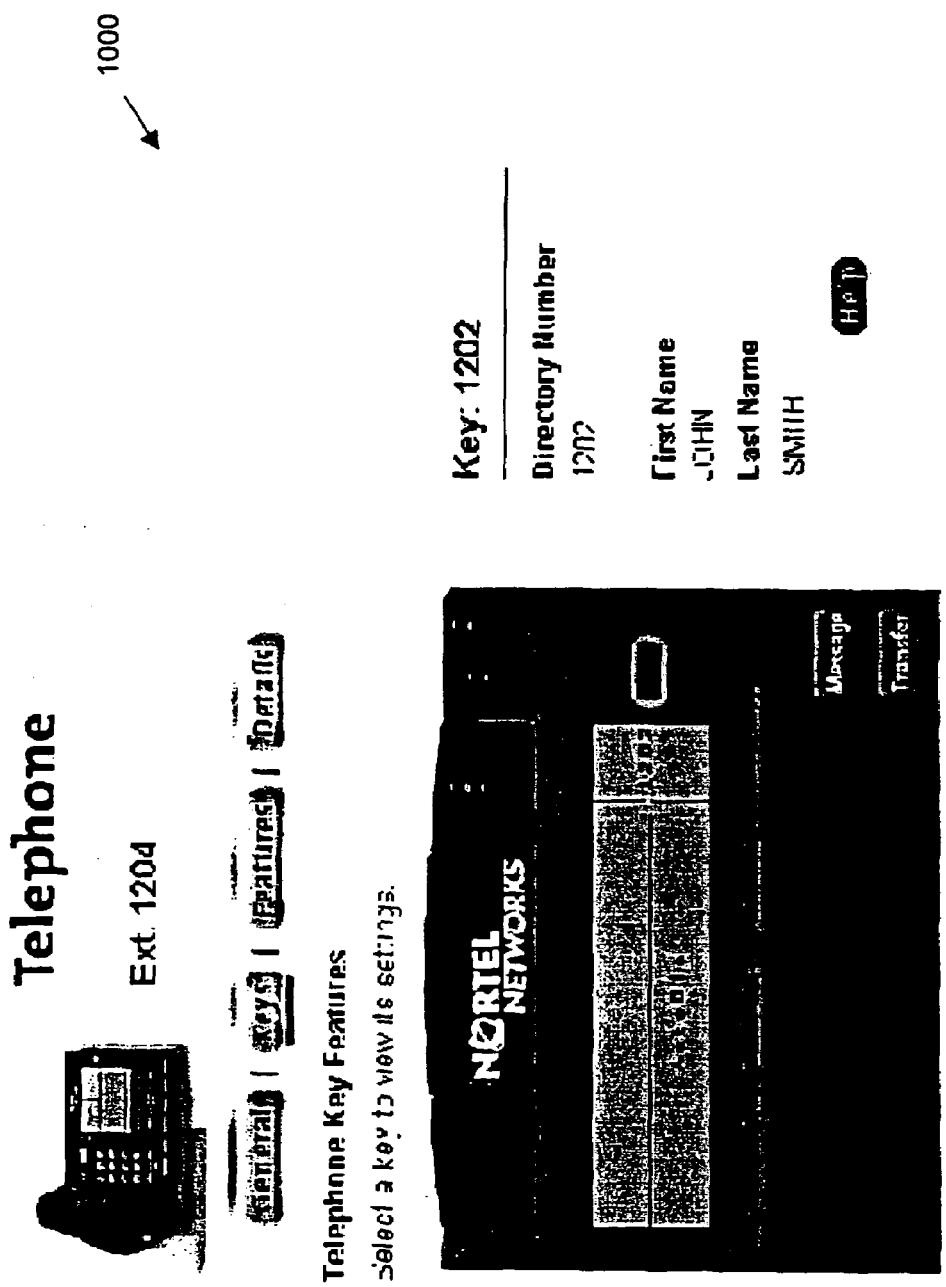

Referring to FIG. 10, it is an exemplary screen shot 1000 of a telephone display providing links to telephone key feature explanations. FIG. 11 is an exemplary screen shot 1100 of a list of telephone features. FIGS. 10 and 11 show what a typical user would see when the user logs on to the Web application server to get programming and help access to the user's asset—in this instance, a telephone. As shown in FIG. 11, the set of features and their access state is available to the user. Furthermore, the user can select the keys from the appropriate telephone image displayed, and features, to get more help on using and programming the keys and the features. This help is consistent with the customized environment of the user and also the capabilities of the devices and access granted to the user by the administrator.

Figure 12:
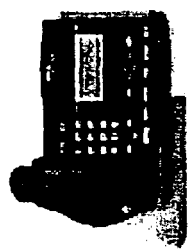
Figure 13:
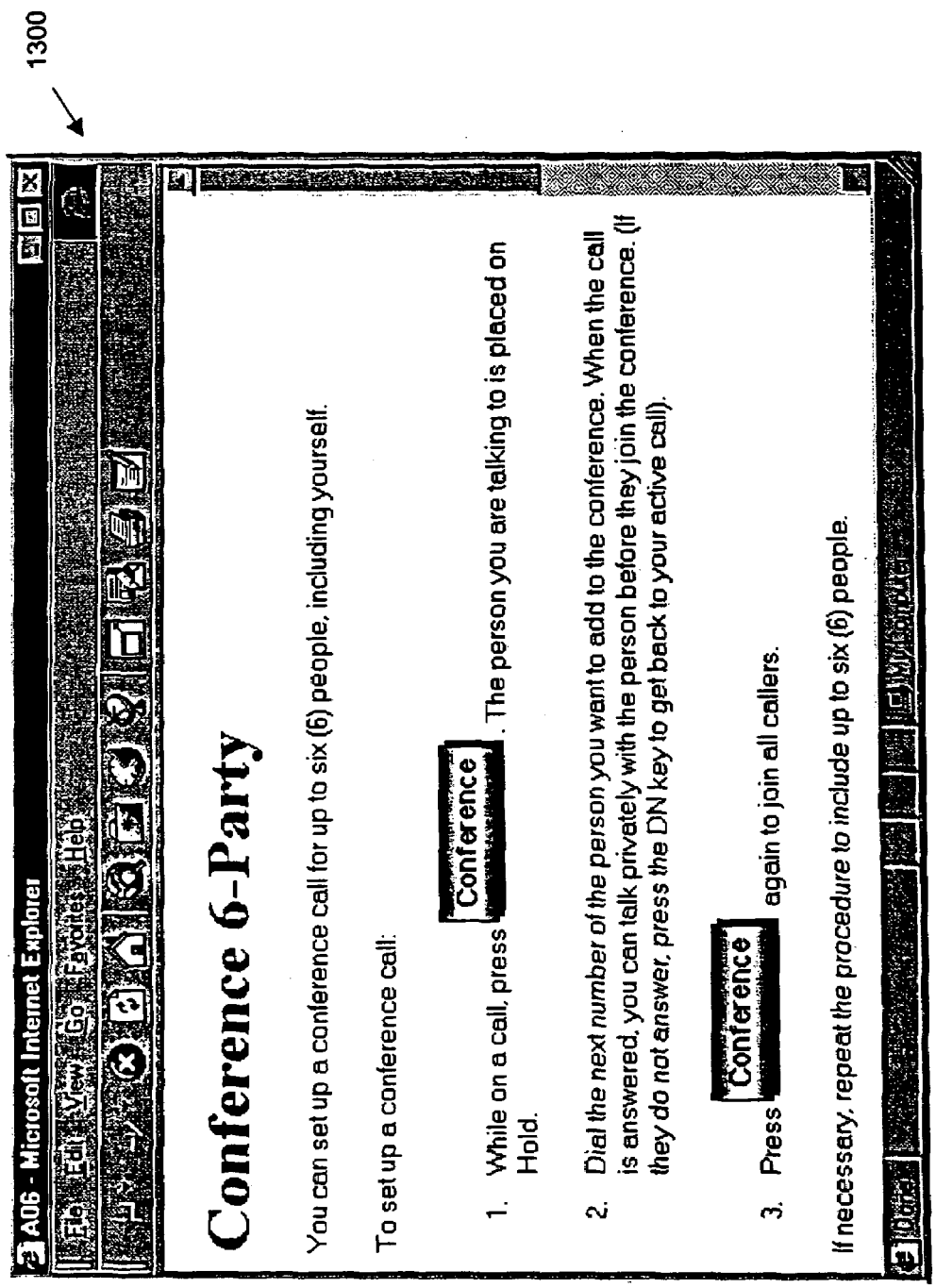

Referring to FIGS. 12 and 13, these figures go further into the Web application that the user is presented with as the user logs on to the Web application server to view and configure the user's assets. FIG. 12 is an exemplary screen shot 1200 of a telephone display providing links to telephone key feature explanations. Shown in FIG. 13 is an exemplary screen shot 1300 of a sample Help Page that is displayed to the user to guide the user in the use of the programmable features of the telephone, in this case the 6-party conference feature.

Not only can the set of features available to a user differ based on the type of device providing service and the policy restrictions in place, but also their use may differ based on the type of asset being used to avail the service. For example the conferencing feature on a telephone may be activated in different ways based on the telephone. At the same time, the type of conferencing features allowed to the users of a group depends on the configuration of the telecom switch and the company's policies regarding its usage.

It should be understood that the presently preferred embodiments described herein can be extended to any device or any asset—not just telephones—or different types of telephones like IP Phones—which may in fact consist of a software application running on a personal computer connected to a network, for example.

The help information system takes all these aspects into account while presenting the user with the appropriate guide text to help understand and program the features on the user's telephone.

Multiple Devices and Assets

Examples given here and particularly with reference to FIGS. 4-13 apply to the OPTIVITY Telephony Manager (OTM), a management server for Nortel Networks of Ottawa, Canada. However, it should be understood that the systems and method described herein apply to any situation where a variety of devices and assets are managed or accessed by users through applications that run on or interact with these devices. The devices and assets may be quite complex in nature and may be capable of supporting a multitude of programmable features. The functional aspects and behavior of these devices and assets may be altered in a significant manner during their operational lifetime.

The system is capable, and most useful, in environments that deploy multiple types of service provider devices and assets. One example of such an environment is one that includes a Voice-Over-Internet Protocol (VoIP) switch as well as traditional telecom switches. A user who has telephone sets on both kinds of systems can get customized help guides suited to not only the working of each set but also the inter-working of these heterogeneous networks. This would greatly aid the user, for example, in troubleshooting problems that the user may face in the course of configuring assets and of regularly using the assets.

User Access to Functionality

One aspect of the presently preferred embodiments described herein is that the user can directly access the programming interface for the assets that the user owns, subject to ownership and access privileges. The user can also connect to the application servers that manage these assets. This means that the user can alter the features and capabilities of the resources the user owns—for example, a user can use the telephone keys to program features such as the voice mail greeting, for example.

At the same time the user has access to more powerful applications, typically residing on a server, that can enable him to view and configure the features on the assets which the user owns. The applications that interact directly with the help system in order to present the user a unique, personal and customized guide to using the application in order to configure the user's assets.

It should be understood that the presently preferred embodiments are not limited to providing customized help guides for network devices and assets. The system can be extended and deployed in any environment targeted to providing context sensitive, custom, unique, personalized material and information, in the form of help and user's guides, for example, to the user of a software application.

Configurable Service Providers

The service provider device, for example, the telecom switch, can be dynamically reconfigured by an administrator to redefine, add, or delete new features available to the equipment serviced by the device. Even if the equipment features themselves do not change, the service features may change. For example, an end user may no longer be allowed to make long distance calls from the end user's telephone, or a password may be required to activate this feature.

The customizable help system preferably dynamically links to the appropriate help guides to represent the changes in the feature set and working of the service providers and related equipment. The system also provides to an administrator the added flexibility to provide a customized environment to the users.

More Understandable Manuals

Since help is presented that is preferably focused, relevant to the context, and customizable, the user does not have to deal with complex manuals that are often confusing and difficult to understand.

Custom Features and Access to Help Information on Custom Features

Available custom features may easily be programmed into a system so that the system then automatically picks up the default or customized help text for users accessing this functionality.

The administrator can annotate and customize the original help text files shipped with the system. The users accessing this dynamic help system would not only get the appropriate help guide based on the features and services provided by the system but would also get access to customized help guides and text relevant to their unique working environment.

An administrator can use an intuitive user interface preferably built onto the Web application management server to customize and annotate the help files presented to the users. The actual help text presented to the user preferably goes through the aspects of security, access levels, device and asset capabilities, and personal preferences. During system upgrades and re-installations, the help guides are suitably migrated to reflect new functionality, added features, removed features, and changes in user environment.

Security

Users are preferably granted access to customized help based on, for example, privilege levels, user permissions, security hierarchy, and network group memberships. In many cases, the security hierarchy will often largely reflect the organization hierarchy of a company or other group. A user's position in the security hierarchy is preferably used to determine the user privileges and access permissions to assets and devices. Groups or classes to which the user belongs may be afforded a set of privileges and permissions. These privileges and permissions preferably affect the help information, for example, dynamic help texts on features, available to the user.

In addition, the user gets help information and is provided the opportunity to learn to use features that are relevant for the user. The user is not granted the opportunity to learn how to administer the entire PBX switch, for example. If a user does not have access to use certain features, or if the user has been disabled on a service provider device that controls configurable assets, the user does not get any manual pages, help guides, or even references to those features through the user's online documentation.

Automatic Detection and Enabling of Feature Based Help

Preferably, the help system is dynamic and picks up the changes in configuration to service provider devices and assets as well as security and customizable changes to present the appropriate help texts to the users of the application.

Distributed Systems Environment

Preferably, the help system is also capable of providing custom, dynamic help on features that exist and are usable by virtue of multiple network devices interacting together to provide a service to the user. An example being the user making a phone call to another user on the same network, or another network, using the same switch, multiple switches, for example different switches using media of differing technologies.

It should be understood that the embodiments of the help information system may function to support service provider devices and the assets that receive a service from the service provider devices. However, the help information system may also be utilized to support a singular device or a singular asset. For example, the system can support a software application that has changing features in a dynamic environment, for example.

As used herein, the term management server is intended to refer broadly to a computing device such as a server that includes at least some degree of management capability over devices and assets on a network. Preferably, a network manager deploys a management server to configure, manage, and monitor a portion of a network, such as an enterprise network. An example of a management server is the OPTIVITY Telephony Manager (OTM) management server from Nortel Networks. Other possible management servers from Nortel Networks include the OPTIVITY Network Configuration System and the OPTIVITY Network Management System, although any suitable management servers may be used.

As used herein, the term asset is intended broadly to refer to any of a variety of diverse entities and resources on a network that are capable of receiving a service from a service provider device. The relationship between an asset and a service provider may be that of client to server. An asset may be, for example, an network entity. A link between two or more network entities may also be an asset. Similarly, a software application or a network service, rather than a physical entity, may also be an asset. A network itself may be an asset. Physical or virtual subnetworks of a network may be assets, for example. Examples of assets include telephone equipment, a telephone, telephone equipment sets, a router, such as a data router, a switch, such as a data switch or a telecommunication switch, a switch module, a hub, a bridge, a network interface card, a PBX, telecommunication entities, any entity that supports the SNMP, any entity that supports at least one of the standard management information base (MIB) objects, any entity that supports at least one of the standard MIB objects and supports the SNMP, and any entities capable of supporting a telnet or an http management interface or other suitable protocol interface. The assets can themselves be wireless entities, for example a Wireless Ethernet Hub for a local area network (LAN). Those skilled in the art will understand that the term asset broadly refers to a wide variety of entities and links and that these entities and links would be useful in a wide variety of applications.

As used herein, the terms service provider and service provider device are intended broadly to refer to any of a variety of diverse entities and resources on a network that are capable of providing a service to an asset. The relationship between a service provider and an asset may be that of server to client. A service provider may be, for example, a network entity. A link between two or more network entities may also be a service provider. Similarly, a software application, rather than a physical entity, may also be a service provider. A network itself may be an service provider. Physical or virtual subnetworks of a network may be service providers, for example. A service provider may be an organization that provides a service, such as an Internet service provider (ISP). Examples of service providers and service provider devices include a server, such as a voice mail server, an e-mail server, or a Web server, a router, such as a data router, a switch, such as a data switch or a telecommunication switch, a switch module, a hub, a bridge, a network interface card, a PBX, telecommunication entities, any entity that supports the SNMP, any entity that supports at least one of the standard MIB objects, any entity that supports at least one of the standard MIB objects and supports the SNMP, and any entities capable of supporting a telnet or an http management interface or other suitable protocol interface. The service providers and service provider devices can themselves be wireless entities, for example a Wireless Ethernet Hub for a local area network (LAN). Those skilled in the art will understand that the terms service provider and service provider device broadly refer to a wide variety of entities and links and that these entities and links would be useful in a wide variety of applications.

As used herein, the term network is intended broadly to refer to any of a variety of types of networks and network technologies. The network being managed can be, for example, a data communications network. The network can be, for example, a wired network, a data network, voice network, an optical network, a wireless network, or a converged or heterogeneous networks that includes any combination of wired, wireless, optical, data, and voice.

Those skilled in the art will recognize that the underlying communication media and protocols used to achieve basic transmission of electronic signals is fundamentally important at a basic level but of little consequence to the description of the systems and methods presented herein. Of relevance to the systems and methods is using known and even heretofore unknown but suitable communication media, protocols, and techniques to achieve provide management of configurable assets in a distributed system, as provided by the presently preferred embodiments and the systems and methods described herein.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method of managing configurable assets in a distributed system environment including a management server controlled by an enterprise and at least one service provider device controlled by a service provider, the method comprising:
   storing, by the management server, help information about the configurable assets;
   synchronizing the management server with the service provider device by obtaining user information indicative of which configurable assets are associated with a user, and which features are enabled for that user;
   storing, by the management server, the user information about users associated with the configurable assets;
   receiving requests for the help information from the users; and
   sending, by the management server, the help information to the users in accordance with the user information.

2. The method of claim 1, further comprising:
   updating the help information in response to changes to the configurable assets and to service provider devices that support and control the configurable assets.

3. A system to manage configurable assets in a distributed system environment, the system comprising:
   A database to store help information about the configurable assets, and user information about users associated with the configurable assets; and
   A management server controlled by an enterprise, and operable to synchronize with a service provider device controlled by a service provider by obtaining user information indicative of which configurable assets are associated with a user, and which features are enabled for that user, and further operable to receive requests for the help information from the users, the management server being operable to send the help information to the users in accordance with the user information.

4. The system of claim 3, wherein the management server includes Web server functionality.

5. A system to manage configurable assets in a distributed system environment including at least one service provider device controlled by a service provider, the system comprising:
   means controlled by an enterprise for storing help information about a plurality of configurable assets;
   means controlled by the enterprise for synchronizing with the service provider device by obtaining user information indicative of which configurable assets are associated with a user, and which features are enabled for that user;
   means for storing user information about users associated with the plurality of configurable assets;
   means for receiving requests for the help information from the users; and
   means controlled by an enterprise for sending the help information to the users in accordance with the user information.

6. A method of managing configurable assets in a distributed system environment including a management server controlled by an enterprise and at least one service provider device controlled by a service provider, the method comprising:
   storing, by the management server, help information about a plurality of configurable assets and the service provider device and about features of the configurable assets and a service provider device, the configurable assets under control of the service provider device;
   storing user information about users associated with the configurable assets;
   updating the user information;
   automatically discovering status information regarding the service provider device and the configurable assets;
   automatically updating the stored help information according to the status information indicative of which features are enabled for that user;
   manually updating the help information according to instructions from an administrator;
   receiving requests for the help information from the users;
   granting the users access to the help information according to user information; and
   prompting, by the management server, sending the help information to the users.

* * * * *

UNITED STATES PATENT AND TRADEMARK OFFICE
CERTIFICATE OF CORRECTION

PATENT NO. : 7,313,592 B1
APPLICATION NO. : 10/932373
DATED : December 25, 2007
INVENTOR(S) : Huboi et al.

It is certified that error appears in the above-identified patent and that said Letters Patent is hereby corrected as shown below:

Title page, item [57]
In the Abstract should read as follows:

At Line 10, A synchronization process occurs so that "thew" --the--

Signed and Sealed this

Sixteenth Day of September, 2008

JON W. DUDAS
*Director of the United States Patent and Trademark Office*